United States Patent
Marioni

(10) Patent No.: US 9,595,849 B2
(45) Date of Patent: Mar. 14, 2017

(54) SYNCHRONOUS ELECTRIC MOTOR HAVING A MOBILE STATOR BODY DESIGNED FOR EASE OF ASSEMBLY, CORRESPONDING MOBILE STATOR BODY AND INHERENT METHOD OF ASSEMBLY

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 498 days.

(21) Appl. No.: 13/381,812

(22) PCT Filed: Jul. 2, 2010

(86) PCT No.: PCT/EP2010/004014
§ 371 (c)(1),
(2), (4) Date: Feb. 13, 2012

(87) PCT Pub. No.: WO2011/000575
PCT Pub. Date: Jan. 6, 2011

(65) Prior Publication Data
US 2012/0133250 A1    May 31, 2012

(30) Foreign Application Priority Data

Jul. 2, 2009  (EP) .................................... 09425260
Jul. 2, 2009  (EP) .................................... 09425261

(51) Int. Cl.
*H02K 3/48*    (2006.01)
*H02K 3/34*    (2006.01)
(Continued)

(52) U.S. Cl.
CPC ............ *H02K 1/148* (2013.01); *H02K 3/522* (2013.01); *H02K 15/0457* (2013.01); *H02K 15/066* (2013.01); *H02K 2203/06* (2013.01)

(58) Field of Classification Search
CPC ............. H02K 1/18; H02K 1/148; H02K 3/46
(Continued)

(56) References Cited

U.S. PATENT DOCUMENTS 5,652,470 A * 7/1997 von der Heide et al. .. 310/67 R
6,081,059 A * 6/2000 Hsu .............................. 310/179
(Continued)

FOREIGN PATENT DOCUMENTS

JP    09019119 A  * 1/1997
JP    09191588 A  * 7/1997
(Continued)

OTHER PUBLICATIONS

Machine Translation JP2009177985(2009).*

Primary Examiner — Jose Gonzalez Quinones
(74) Attorney, Agent, or Firm — Akerman LLP

(57) ABSTRACT

The invention relates to a body (1) for the winding of conducting wire with unusually high packing coefficient, comprising a plurality of reels (2), connected in sequence (12) at a predefined pitch, intended to receive by winding the conducting wire, it being possible to articulate the body (1) from an initial arrangement, suitable for receiving the conducting wire by winding on the reels (2), to a substantially circular arrangement, wherein the reels (2), wound, are assembled in an electric motor; the body (1) comprises connection portions (3) which can be configured in such a way that said pitch is high, for the winding, and small, for the assembly; the invention also relates to a synchronous electric motor (1) with central stator (12) and external rotor (32) and comprising a plurality of reels (2) per the stator windings arranged according to a pre-defined pitch and intended to receive respective windings of a conducting wire, wherein the stator (12) comprises a body (10) with mobile structure and which can be articulated from an initial arrangement, suitable for receiving conducting wire by winding on reels (2), to a final arrangement of substantially annular configuration wherein the wire wound on the reels (2) has ends electrically connected to corresponding termi- (Continued)

nals of an electronic printed circuit board associated with the stator of the motor.

17 Claims, 12 Drawing Sheets

(51) Int. Cl.
*H02K 1/06* (2006.01)
*H02K 3/20* (2006.01)
*H02K 1/14* (2006.01)
*H02K 3/52* (2006.01)
*H02K 15/04* (2006.01)
*H02K 15/06* (2006.01)

(58) Field of Classification Search
USPC ........... 310/215, 216.078, 216.095, 216.098, 310/216.105, 216.109, 216.114, 216.115, 310/214
See application file for complete search history.

(56) References Cited

U.S. PATENT DOCUMENTS

| | | | |
|---|---|---|---|
| 7,462,966 B2 * | 12/2008 | Marioni | 310/67 R |
| 7,576,467 B2 * | 8/2009 | Yamamoto et al. | 310/216.009 |
| 7,598,637 B2 * | 10/2009 | Niehaus et al. | 310/71 |
| 2004/0051417 A1 | 3/2004 | Yamazaki et al. | |
| 2007/0013256 A1 * | 1/2007 | Sheeran et al. | 310/218 |
| 2009/0128075 A1 * | 5/2009 | Hiwaki et al. | 318/400.38 |
| 2010/0138127 A1 | 6/2010 | Boughtwood | |

FOREIGN PATENT DOCUMENTS

| | | | |
|---|---|---|---|
| JP | 2001-136700 A | | 5/2001 |
| JP | 2007151312 A | * | 6/2007 |
| JP | 2008067569 A | * | 3/2008 |
| JP | 2009177985 A | * | 8/2009 |
| WO | 2005/006517 A1 | | 1/2005 |

* cited by examiner

Detail W

Fig. 11
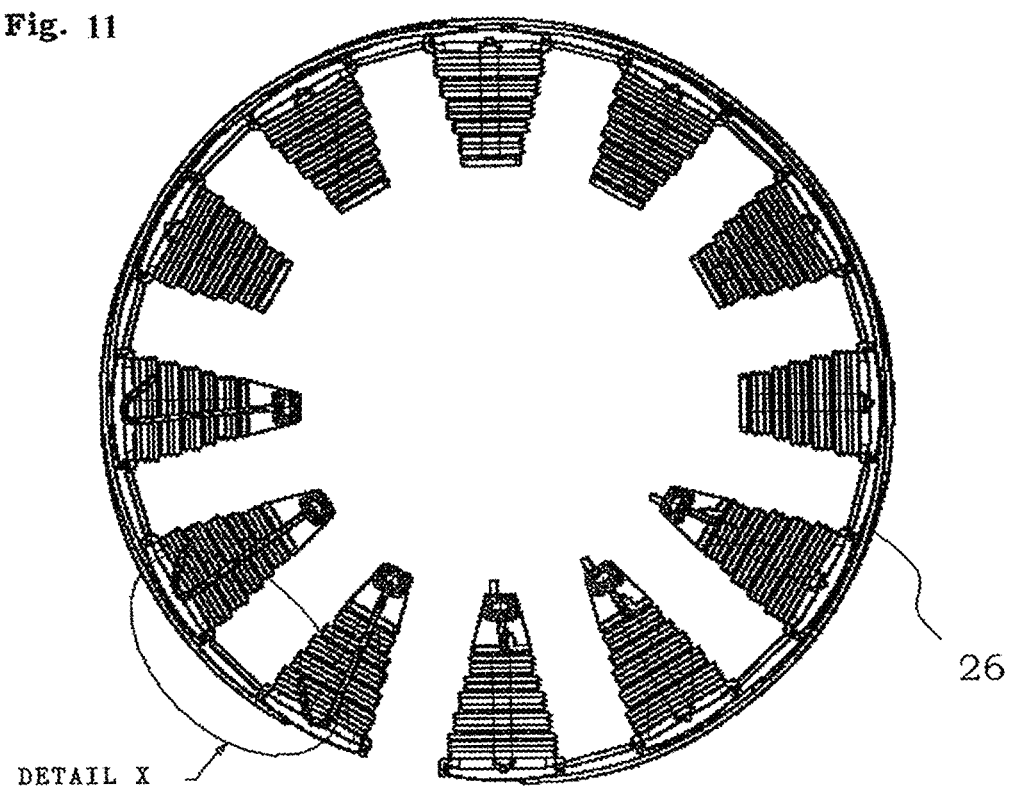
26
DETAIL X
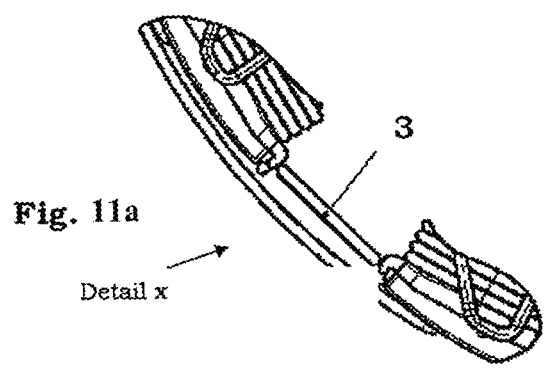
Fig. 11a
Detail x
3
Fig. 11b
z
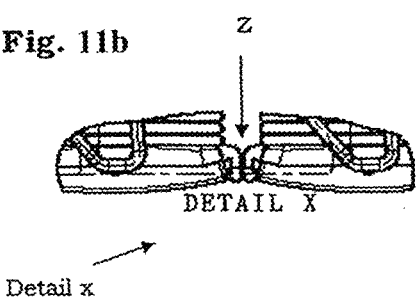
DETAIL X
Detail x

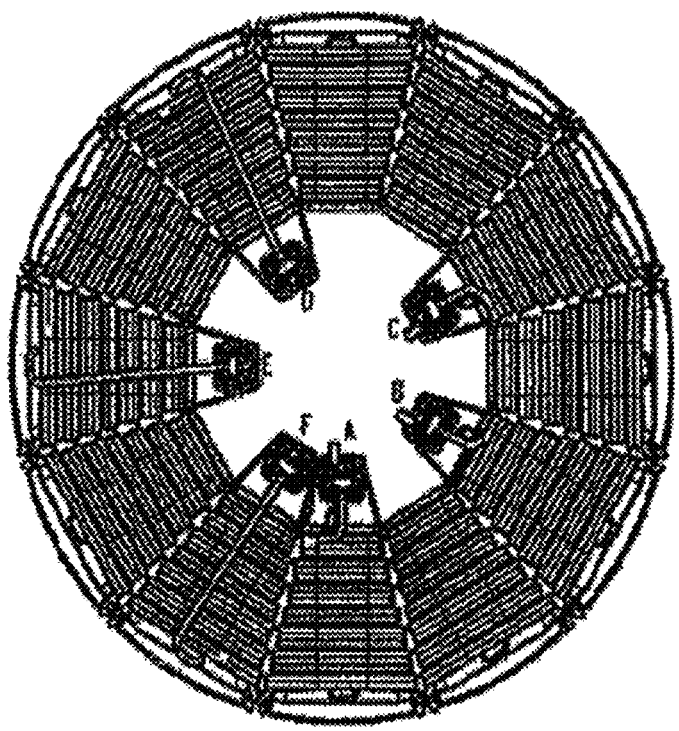
Fig. 12
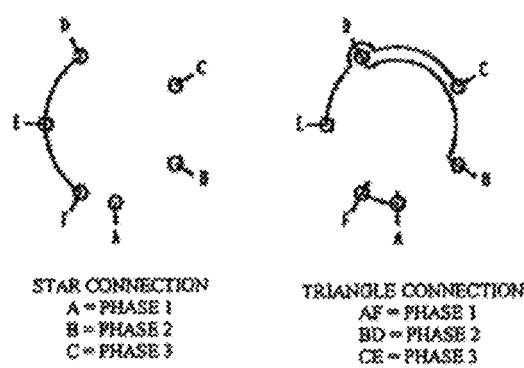
Fig. 12a
Fig. 12b

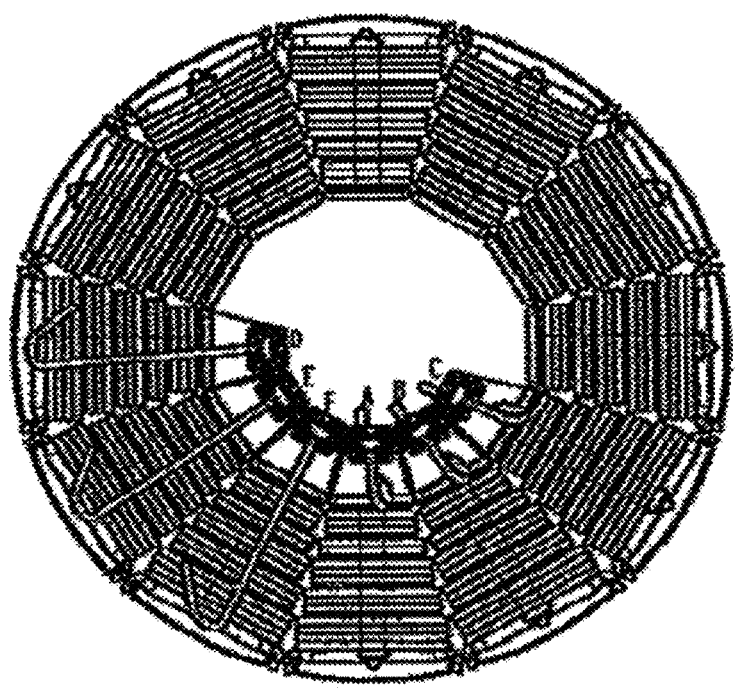
Fig. 13
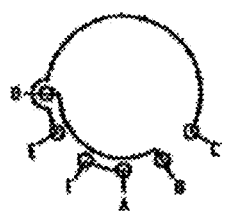
TRIANGLE CONNECTION
AF = PHASE 1
BD = PHASE 2
CE = PHASE 3
STAR CONNECTION
A = PHASE 1
B = PHASE 2
C = PHASE 3
Fig. 13a        Fig. 13b

SYNCHRONOUS ELECTRIC MOTOR HAVING A MOBILE STATOR BODY DESIGNED FOR EASE OF ASSEMBLY, CORRESPONDING MOBILE STATOR BODY AND INHERENT METHOD OF ASSEMBLY

This application is a national phase of PCT/EP2010/004014, filed Jul. 2, 2010, and claims priority to EP 09425260.8, filed Jul. 2, 2009 and EP 09425261.6, filed Jul. 2, 2009, the entire contents of which are hereby incorporated by reference.

FIELD OF APPLICATION

The present invention relates to a synchronous electric motor with central stator and external rotor and comprising a plurality of reels for the stator windings arranged according to a predefined pitch and intended to receive respective windings of a conducting wire.

The present invention also relates to a body for such an electric motor, which comprises the above-mentioned plurality of reels, arranged according to a predefined pitch and intended to receive by winding at least one conducting wire.

More particularly the present invention also relates to a body of the aforementioned type wherein winding of the conducting wire on the reels is mechanised by means of a winding machine, for example of the flyer type, comprising a mobile head suitable for positioning in proximity of the reels and for rotating around them to wind the conducting wire.

The present invention also relates to a method of assembly of said body

PRIOR ART

In recent years the electric motors for applications of greater reliability, stability, duration and practicality of use have been made with permanent magnet synchronous motors.

In these motors the stator is configured as an annular or cylindrical body. In the first case permanent magnet rotor is housed inside the stator, while in the second case the rotor is external to the stator and configured for example as a cylindrical cup.

For greater power applications motors with a high number of stator poles are used. This is the case for example of synchronous motors intended for piloting the washing drum of a laundry washing machine.

The stator normally comprises pole expansions made by wounding conductive wires on appropriate reels formed in the annular body.

Albeit advantageous in various aspects compared to traditional asynchronous motors, these synchronous motors have some disadvantages due to their difficult starting. In fact the rotor has to pass rapidly from a state of starting at zero speed to a state of turning, or synchronism, wherein the frequency of rotation is in phase with the frequency of the source of electrical power supply.

Moreover, at the normal frequencies of 50 or 60 Hz of the electrical power supply system, the rotor has to be able to reach the speed of synchronism in a time equal to a period divided by the number of pole torques. This need is objectively difficult to meet, above all when the rotor has also to overcome initial inertia due to the load.

In this context there is the need to be able to produce different motors according to the needs of the applications. However this entails high costs in that economies of scale cannot be exploited in the best possible way.

In one of its aspects, the present invention is aimed at devising a particularly polyhedral structure of synchronous electric motor having features such as to allow the producer to adapt assembly and production of the motors to the needs of users swiftly and easily.

In other words the invention is aimed at using common basic components in order to be able to assemble synchronous electric motors having a different number of stator poles and therefore being suitable for applications of a different type.

In a further aspect, the present invention is aimed at making available a synchronous motor structure having structural and functional features such as to allow particularly simple assembly, also reducing the total costs of the motor.

In a further aspect, the present invention is directed to devising a synchronous electric motor of the aforementioned type and equipped with an electronic starting and stopping device having such structural and functional features as to guarantee rapid reaching of synchronism during the starting phase and an effective phase of stopping, avoiding stresses on the components of the motor and at the same time overcoming the limits of the solutions currently proposed by the prior art.

In still a further aspect, as mentioned above, the present invention relates to a body for the above electric motor, which comprises a plurality of reels, arranged according to a predefined pitch and intended to receive by winding at least one conducting wire.

As is well known, in electric motors the stator is configured as an annular or cylindrical body. Internally or externally to the stator a permanent magnet rotor is housed, intended to rotate concentrically in relation to the stator.

The stator comprises pole expansions obtained mechanically by means of the winding of conducting wires on appropriate reels formed in the annular body.

The mechanised winding of each conducting wire is preferably distributed on pairs of opposite reels, obtaining pairs of windings whose ends, which are presented on the same side in relation to the body of the stator, must be appropriately powered.

Generally, for mechanised winding, winding machines are used, for example of the flyer type, which comprise a mobile head suitable for positioning in proximity of a reel, inside the annular body, and for winding the conducting wire via a circular movement around it. The ends of each conducting wire are tightened manually by means of clamps, for example of the Faston type, subsequently connecting each clamp to a power board.

This solution nevertheless has some disadvantages, in fact the movement of the mobile head of the winding machine is obstructed in the space inside the annular body as this space is reduced considerably as the number of reels already wound increases, constituting a limit to the formation of windings able to exploit the entire hollow space available.

It is also necessary to pay special attention during the phase of assembly and of fitting of the motor due to the presence of the free ends of the conducting wires which can therefore move, making the operations of connection of the wires with the Faston clamps difficult.

These operations obviously entail a lengthening of the times and an increase in the operations of assembly of the motor with a consequent increase in the production costs.

Another solution of the known type for forming the windings of the stator provides for the arrangement of a body, from a substantially linear position to a loop position. The mobile body is for example structured by means of a plurality of annular segments, hinged in sequence. Two opposite ends of the sequence of annular segments comprise a hooking point which allows the mobile body to be closed from the linear position to the loop position.

One or more reels are formed on the linear segments, suitable for receiving by winding the conducting wire. This winding operation is performed when the mobile body is in the linear position, allowing easy movement of the mobile head between one reel and the other. When the conducting wire is wound on all the reels the mobile body is closed in the loop position.

Although this solution is advantageous, it does not however allow an improvement in the movement of the mobile head around a single reel:

when in fact a first reel is wound with conducting wire, the space for action of the mobile head around a reel adjacent to the first is considerably reduced due to the bulk of the conducting wire already wound on this first reel.

A mobile body made in this way does not therefore allow an increase in the coefficient of packing on the reels, i.e. an increase in the number of turns of conducting wire around each reel, given that there must be the necessary space between adjacent reels for ensuring movement of the mobile head of the winding machine.

This technical problem is particularly felt as in many applications of the electric motor it is essential to limit its overall dimensions, at the same time optimising the cost of the material, for example using a conducting wire in aluminium which, although having a lower cost compared to the commonly used copper, has lower electrical conductivity and therefore on a par with ampere turns and Joule losses requires a larger section of the wire leading to a greater volume in the single coil and making exploitation of the hollow space available more critical, often constituting a limit to the use of materials less prized than copper in the windings.

According to an aspect thereof, the present invention is thus aimed at devising a mobile body for the windings of the conducting wire of a stator and a corresponding method of assembly having such structural and functional features as to allow a high coefficient of packing on each winding, at the same time guaranteeing fast and easy attachment of the ends of the wires of the windings, overcoming the disadvantages which still afflict the solutions provided according to the prior art.

SUMMARY OF THE INVENTION

According to an aspect of the present invention, it is sought to provide a synchronous electric motor with central stator and external rotor and comprising a plurality of reels arranged, with a predefined pitch distance, on a body with mobile structure and which can be articulated from an initial arrangement, suitable for receiving conducting wire by winding on the reels, to a final arrangement of substantially annular configuration, in which the wire wound on the reels has ends electrically connected to corresponding terminals of an electronic printed circuit board associated with the stator of the motor, wherein the body comprises connection portions which can be configured in such a way to increase the pitch between the reels during winding of the conducting wire and to minimize it with the wire wound, and wherein the connection portions comprise one or more points of weakening, which facilitate bending of the portion between adjacent reels.

Advantageously the distance between reels in the body is made to vary from a maximum value which avoids obstructions during winding of the conducting wire, to a minimum value, which sees the reels arranged one adjacent to the other with predefined clearance.

Moreover the electrical connections between the ends of the windings on the reels are formed on an electronic printed circuit board associated with the stator of the motor and whereon conductive tracks and terminals allow the adoption of a triangle or star electrical connection according to needs.

According to another aspect, the present invention provides a substantially linear body for an electric motor, of the type comprising a plurality of reels arranged according to a predefined pitch and intended to receive by winding at least one conducting wire, characterised in that it comprises connection portions which can be configured in such a way that said predefined pitch is high for the winding, and small for the assembly of the body in the motor, wherein the reels are arranged according to a linear pitch, for the winding, and curved in an annular shape, for the assembly in the electric motor; the connection portions can be shortened from a maximum extension d1, corresponding to said high pitch, to a minimum extension d0, corresponding to said small predefined pitch, and wherein said portions comprise a line of weakening, a change in pitch causing a bending of said portions, on said line of weakening, between adjacent reels.

The connection portions are extended to a maximum when said pitch is high, and extended to a minimum or removed from the body when said predefined pitch is small.

Advantageously the body according to the present invention allows easy winding of the conducting wire around the reels, thanks to a high centre distance between reels during winding, and also achieves a very high packing coefficient by virtue of the small centre distance with the body assembled in the electric motor.

The present invention also relates to a method of assembly of an electric motor comprising a body of the type previously disclosed and claimed in claim 9.

The additional features and advantages of the electric motor and the body according to the present invention will be made clear by the description, herein below, of certain embodiments given by way of non-limiting examples with reference to the accompanying drawings.

BRIEF DESCRIPTION OF THE DRAWINGS

In these drawings:

FIG. 1b shows, in a view from above, the body of FIG. 1a;

FIG. 2b shows, in a view from above, the body of FIG. 2a;

FIG. 11 shows the stator body in one phase of its assembly, according to the present invention;

FIGS. 11a-11b show a part of the stator body of FIG. 11, respectively before and after cutting of the connection portions.

FIG. 12 shows a schematic view of a stator according to the invention with ten poles;

FIGS. 12a-12b show respective schematic views of different modes of electrical connection of the terminals of the stator windings of FIG. 12;

FIG. 13 shows a schematic view of a stator according to the invention with eight poles;

FIGS. 13a-13b show respective schematic views of different modes of electrical connection of the terminals of the stator windings of FIG. 13.

DETAILED DESCRIPTION

Figure 1:
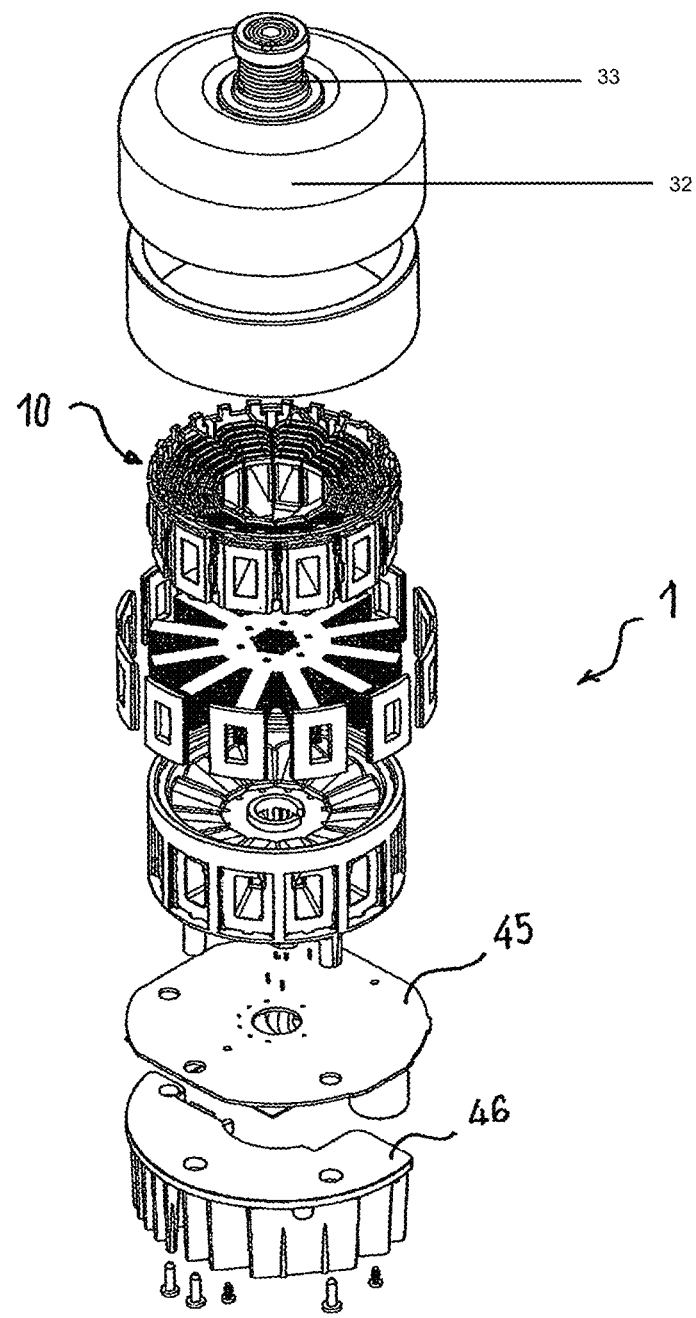
FIG. 1 shows a perspective view with detached parts of a synchronous electric motor made in accordance with the present invention.

Referring to the accompanying drawings, and in particular to the example of FIG. 1, 1 denotes overall and schematically a synchronous electric motor made in accordance with the present invention.

The motor 1 is of the type with central stator 12 and external rotor 32.

More particularly the central stator 12 is structured with a plurality of stator poles made in a particular way and as will be made clear by the rest of the description. The external rotor 32 is substantially shaped as a cylindrical cup and comprises a plurality of permanent magnet members arranged perimetrally on the internal side of the cylindrical cup. The end structure provides a whole ring in anisotropic bonded magnet which is magnetised preferably with 8-10 magnetic poles and positioned in the cup with a precise coupling and the use of epoxy glue.

The stator 12 is integral with an axis X for supporting the motor which can in turn be restrained to the structure or to the frame of an appliance incorporating the motor 1, for example a household appliance such as a washing machine.

The rotor is rotatable around the aforementioned axis X and comprises a hub 33 coupled through interference with the cup 32 and supported on the axis X by means of bearings and provided peripherally with a series of grooves to allow coupling with a member for transmission of motion to the drum of the washing machine, for example a poly-v transmission belt, not shown in that conventional.

The stator comprises a plurality of poles or pole expansions which can be made in a variable number (in the embodiment illustrated here purely by way of an example they are twelve) and with variable arrangement thanks to the particular configuration of the component parts of the stator which will be described in detail herein below. Each pole expansion corresponds to at least one winding of conducting wire wound on a corresponding reel 2, as described herein below.

At one end of the stator an electronic board 45 is restrained which holds all the electronic components necessary for functioning and piloting of the motor 1.

Advantageously the board 45 is made with a circuit printed with PCB technology and comprises circuit tracks of interconnection between the various electronic components mounted on the board 45.

The board 45 is associated with a heat dissipator 46, for example a laminar metal structure, preferably but not necessarily in aluminium, which is made integral with the body of the stator by means of locking screws.

In this way the board is also restrained to the stator and is between the dissipater and the stator itself.

Advantageously, this arrangement of the electronic board 45 is particularly convenient for assembly of the motor 1 in that the electrical connections between the ends of the conducting wire windings on the reels 2 are formed on an electronic printed circuit board associated with the stator of the motor. On this board 45 some conductive tracks and terminals allow adoption for the windings of a triangle or star electrical connection according to needs.

In other words with this solution it is possible to produce or assemble synchronous electric motors having a different number of poles and connection diagrams of the stator windings simply by modifying the electrical connections on the electronic board associated with the stator. We will see further on and in detail how this is possible.

Figure 2A:
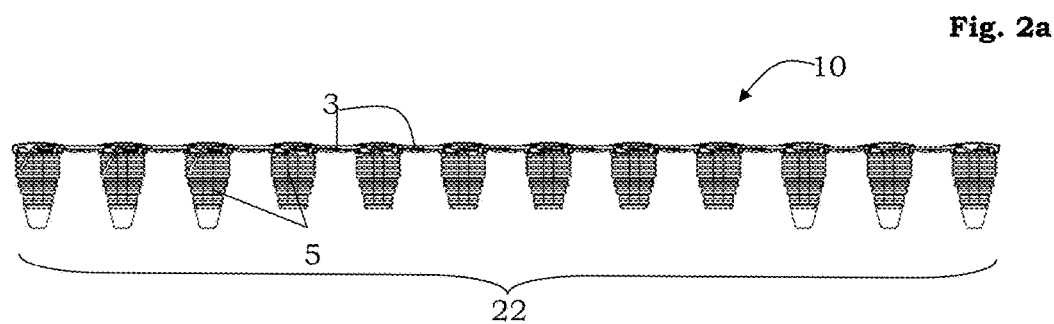
FIG. 2a shows the body of FIG. 1a with relative electrical windings, in another phase of its operation.
Figure 2B:
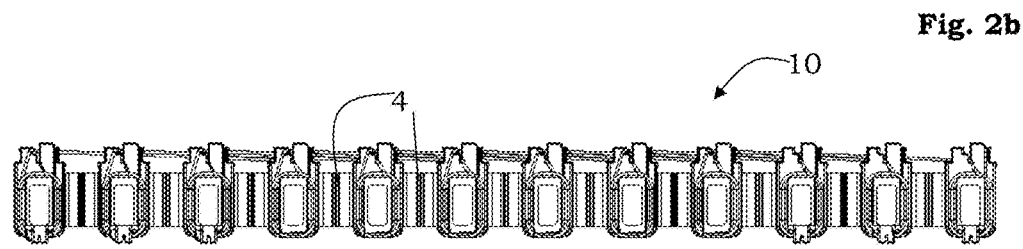
Figure 2:
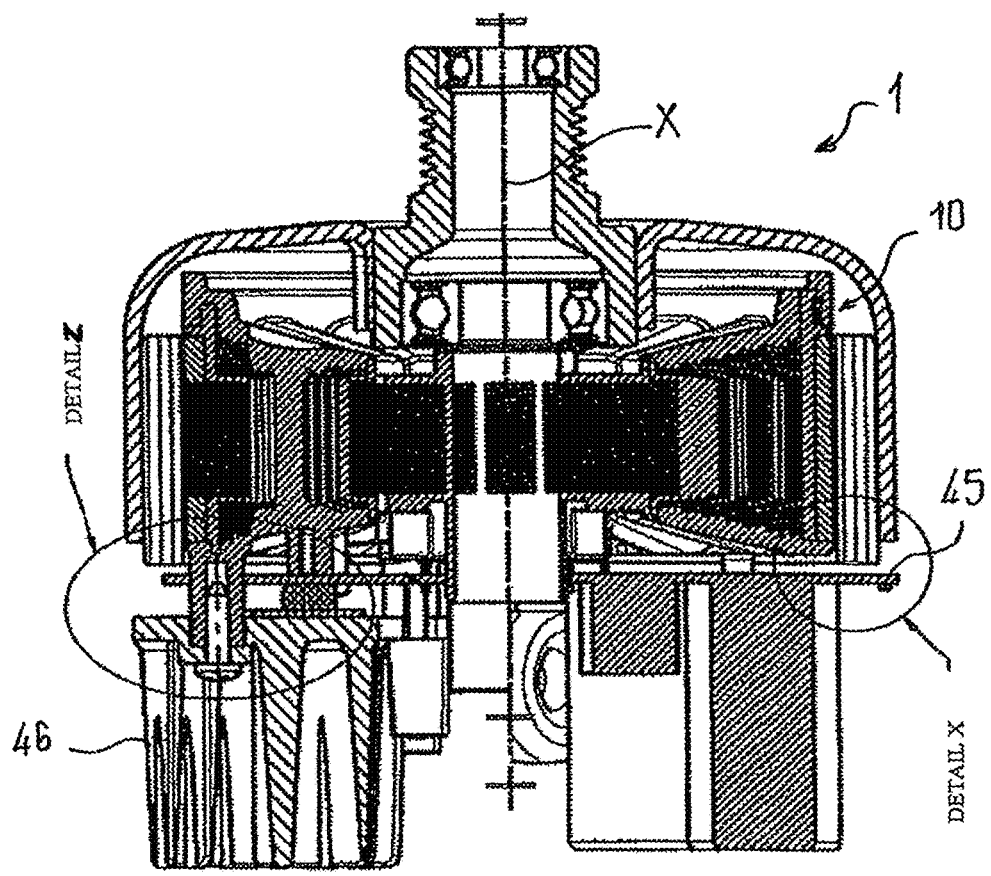
FIG. 2 shows a view in longitudinal section of the motor of FIG. 1 in an assembly configuration.

The board 45, which can be seen in FIG. 2, is substantially circular and has a diameter no greater than the external diameter of the rotor 32.

In a perimetral point (see FIG. 7) of the board 45 a position sensor is connected, for example a sensor with magnetic effect, such as a Hall sensor, which allows detection of the angular position of the synchronous motor. The sensor is positioned on the face of the board opposite the stator magnets. Advantageously this arrangement of the Hall sensor is made possible by the construction of the magnetic ring in plastoferrite which is close to the board, projecting from its containment seat situated in the rotor 32. In traditional solutions however the Hall sensor is placed on a PCB mounted on the face of the board turned towards the stator and must be positioned inside the same (see drawings of the old motor solution) in such a way as to read the magnetic polarities without the vibrations of the structure during operation being able to disturb the signal detected. Advantageously the new arrangement of the Hall sensor preserves the same from the contaminating particles (in particular coming from the wear of the transmission belt) which the permanent magnet inevitably attracts on itself, maintaining it therefore perfectly efficient.

This sensor is used to pilot the synchronous motor 1, in particular to establish the relative rotor/stator position.

The sensor is preferably a magnetic field effect sensor, even if other different types of sensors can be used.

The sectioned view figures of the motor 1 clearly show the rotor, the stator, the board and the dissipator.

Herein below we will describe first the particular structure of the stator for a better understanding of the special features of the entire motor and the economies of scale made possible by the particular architecture devised for its component parts.

The Stator

Figure 1A:
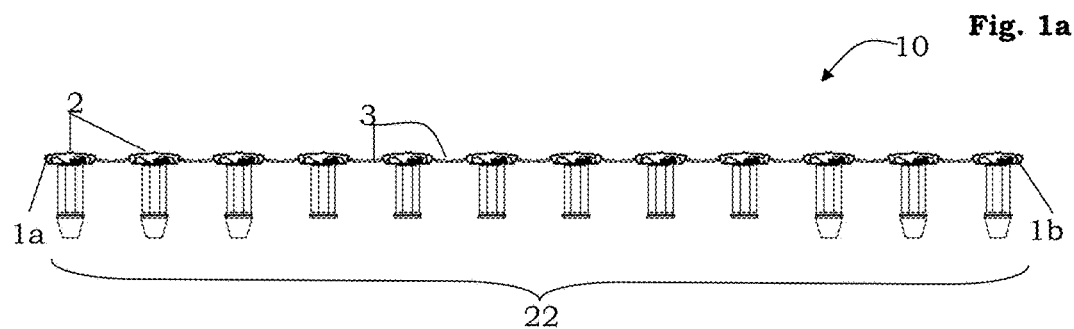
FIG. 1a shows, in a front view, a body, i.e. a part of the stator of the motor, according to the present invention.
Figure 1B:
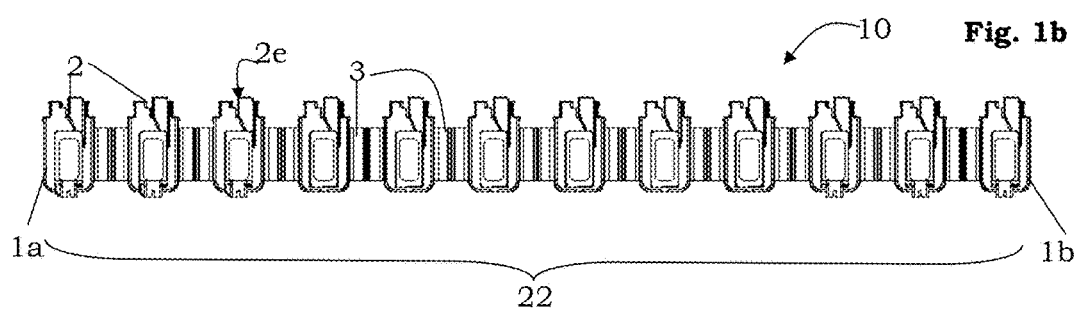

Referring to FIGS. 1a-1b, a body 10 is shown schematically, comprising a plurality of reels 2, each one intended to receive a conducting wire winding to form the pole expansions of the stator of the synchronous electric motor 1.

Referring to the accompanying drawings, and in particular to FIGS. 1a-1b, a body 10 is shown schematically comprising a plurality of reels or bobbins 2, each one intended to receive by winding a conducting wire, suitable for forming the pole expansions of a stator for an electric motor. In particular the mechanised winding of the conducting wire on a reel 2 is achieved by means of a winding machine, for example of the flyer type, comprising a mobile head suitable for taking up position in proximity of the reel 2, rotating around it for the winding of the conducting wire and repositioning at another reel 2 for a further winding operation.

Figure 4A:
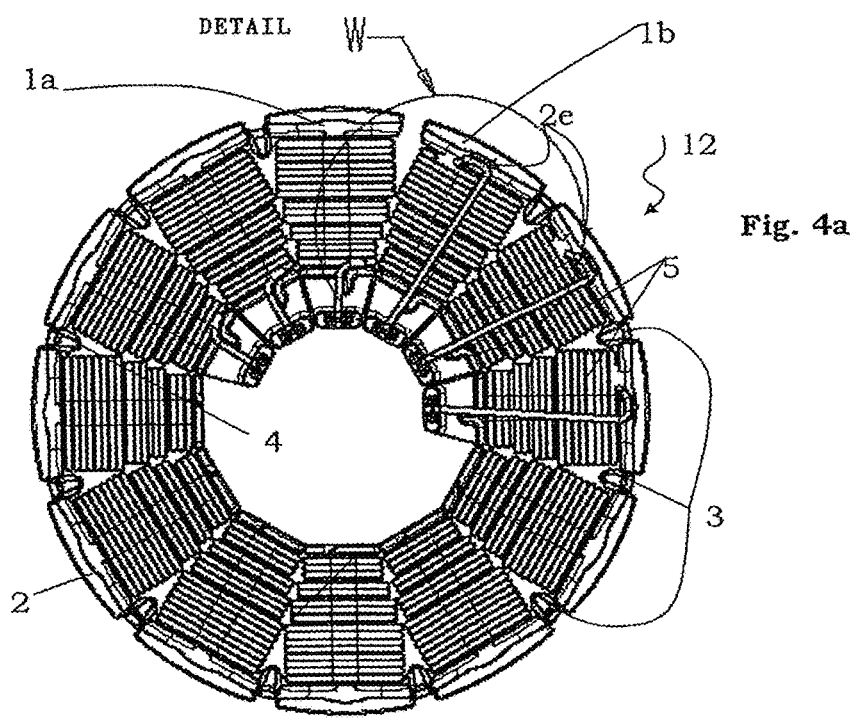
FIG. 4a shows the body of FIG. 2a in a further phase of its operation.
Figure 4B:
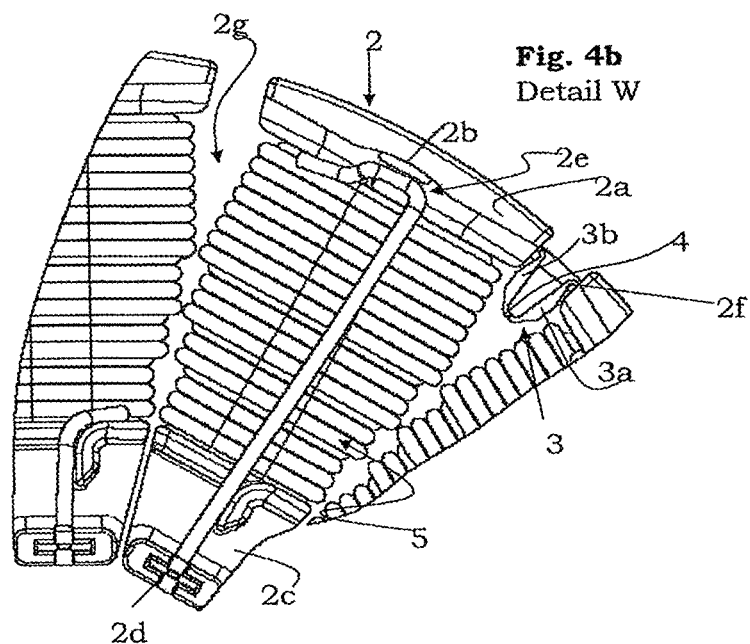
FIG. 4b shows a part of the body of FIG. 4a on an enlarged scale.

As shown in the detail of FIG. 4b, each reel 2 comprises a base 2a, a head 2c opposite the base 2a and a winding portion 2g between the base and the head, suitable for receiving by winding the conducting wire. The reels 2 are connected in sequence 12, at a predefined pitch, for example by means of a strap 3 connected to hooking points 2f, on the respective bases of the reels 2.

In other words the reels 2 are substantially connected, at the base, to a tape-shaped member while the winding portions 2g and the heads of the reels 2c are free from this tape-shaped connection member.

FIG. 1b supplies a view from above of the body 10 of FIG. 1a; both the drawings show the body 10 with the conducting wire not yet wound and are given solely for the purposes of a non-limiting example in relation to the number of reels 2.

FIGS. 2a and 2b refer instead to the body 10 of FIG. 1a with the relative windings of conducting wire, already wound on the reels 2. In the rest of the text a reel 2 with a respective winding of conducting wire will also be referred to as coil and denoted by reference numeral 5, the sequence of twelve coils resulting from winding of the twelve reels 2 denoted by reference numeral 12.

The body 10 can be moved from an initial position, preferably linear, suitable for receiving the conducting wire by winding on each reel 2, encouraging easy movement of the mobile head between the reels 2, to a substantially loop position and of assembly of the stator on other components of the electric motor, wherein the body 10 is substantially closed on itself in an annular shape, as will be made clear by the following description.

According to the present invention, the straps 3 comprise at least one pair of links 3a, 3b hinged one to the other in a hooking point 4. Via the links 3a, 3b, the body 10 can be extended, the distance between two adjacent reels 2 variable from a minimum value d0, wherein these reels 2 are substantially in contact and the two links 3a, 3b which connect them substantially superimposed, to a maximum value d1, wherein the links 3 are distended.

Figure 3:
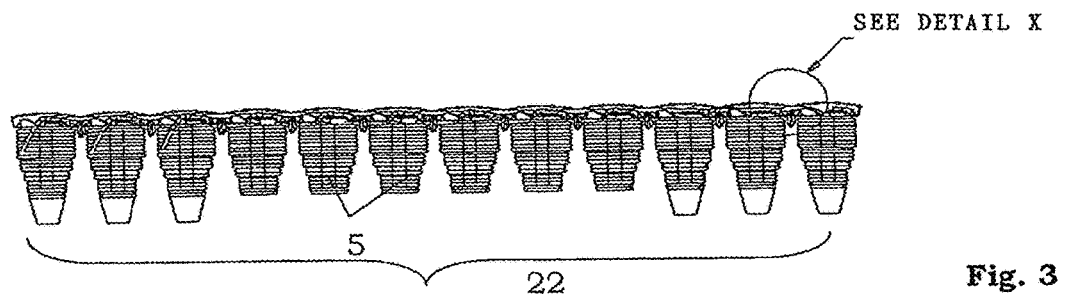
FIG. 3 shows the body of FIG. 2a in yet another phase of its operation.
Figure 3A:
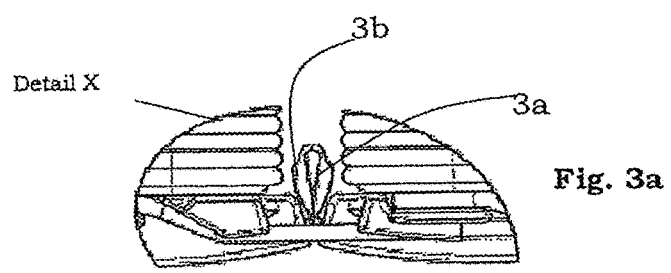
FIG. 3a shows a part of the body of FIG. 3 on an enlarged scale.

This position of distancing of adjacent reels 2 allows the mobile head of the winding machine to rotate around each reel 2, avoiding bulk generated by conducting wire already wound on the coils 5 and consequent contacts with it. FIG. 3 shows schematically the body 10, with conducting wire already wound around the reels 2, in a linear position of minimum centre distance between adjacent reels, obtained by superimposing the two links 3a, 3b as shown more clearly in the detail of FIG. 3a. FIG. 4a shows the body 10 in the loop position and of assembly of the stator.

Preferably, during the phase of winding of the conducting wire, the body 10 is in a position of maximum extension, which can be obtained by distancing all the reels 2 at the maximum distance d1, i.e. distancing all the links 3a, 3b, while during the phase of assembly the body 10 is in the position of minimum extension, i.e. with all the reels at minimum distance d0.

The straps can also be portions 3 in a semi-rigid or elastic material. In the case of elastic material the position of maximum extension of the body 10 is obtained by extending the opposite ends 1a and 1b of the sequence 12 of reels 2, that is to say obtaining an extension of all the portions 3 for joining adjacent reels 2, while the position of minimum extension of the body 10 is obtained thanks to a natural release of the elastic material which forms each of said portions 3.

More particularly the connection portions 3 comprise one or more bending points or points of weakening 4 which facilitate bending of the portion 3 between adjacent reels 2, when the body 10 returns into its position of minimum extension. FIG. 3 shows the body 10 in a position of minimum extension, with the sequence 12 of coils 5 still aligned. Each connection portion 3 can be extended and bent singularly in relation to the other portions 3.

Figure 4C:
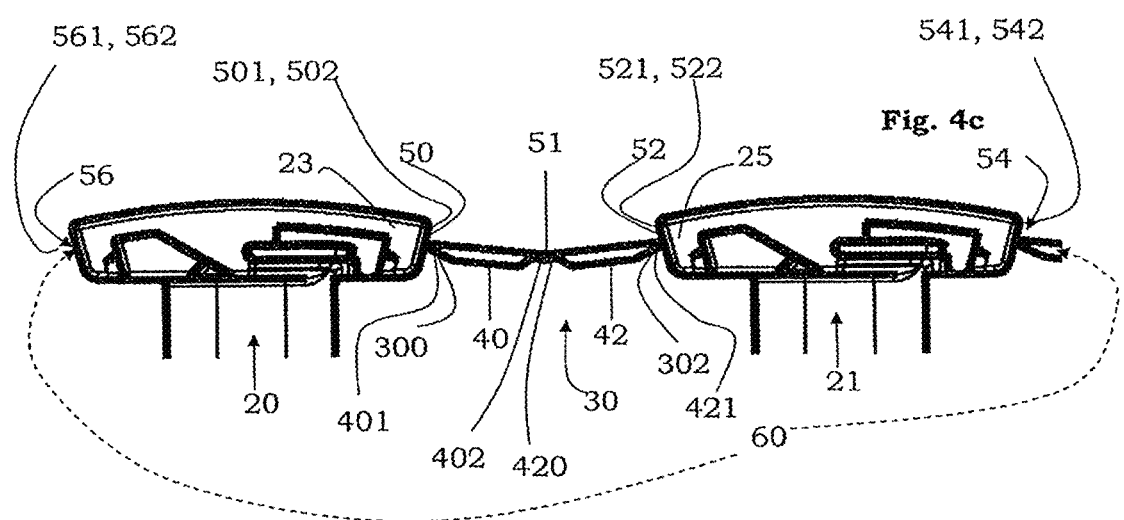
FIG. 4c shows the part of FIG. 4b in another phase of operation of the body.

FIG. 4c shows an enlarged detail of the body 10: reference numeral 23 denotes the base of a first reel 20 and reference numeral 25 the base of a second reel 22. A tape-shaped and deformable member 30 connects the two reels 20, 22, to the respective bases.

The base 23 of the first reel 20 comprises a first and a second hooking point 50, 56, positioned on substantially opposite sides of the base 23; these hooking points are for example loops 501, 561 or hinges 502, 562.

Similarly the base 25 of the second reel 22 comprises a first and a second hooking point 52, 54, positioned on substantially opposite sides of the base 25; in this case too the hooking points are loops 521, 541 or hinges 522, 542.

The loops 501, 561, 521, 541 and the hinges 502, 562, 522, 542 can be made in one part with the respective bases 23, 25 of the reels 20, 22 or can be applied thereto.

The tape-shaped and deformable member 30 comprises a strap 30 having opposite ends which take shape in points of coupling 300, 302 to the hooking points 50, 52, respectively on the base 23 of the first reel 20 and on the base 25 of the second reel 22.

The strap 30 comprises a first link 40 and a second link 42. The link 40 is provided with hinges 401 and 402 and the link 42 with hinges 420 and 421. The hinge 401 of the link 40 is suitable for being hinged to the hinge 502 on the base 23 of the first reel 20 while the hinge 402 of the link 40 is suitable for being hinged to the hinge 420 of the second link 42. The hinge 421 of the second link 42 is instead hinged to the hinge 522 at the base 25 of the second reel 22.

The strap 30 can also be made by means of staples or deformable bridges, which can deform in the hooking points 50 and 52 at the bases of the reels and in the bending point 51, this point 51 encouraging deformation of the staple when the distance between two adjacent reels has changed.

In an embodiment according to the present invention, the body 10 comprises a single deformable tape-shaped member 60 for connection between all the reels, inserted via loops 501, 561, 521, 541 by way of a belt.

The connection portions 3 between reels 2, described above by way of an example, are made preferably in a thermoplastic material for electrical uses and shaped substantially in any way suitable for increasing the pitch between reels 2, during winding of the conducting wire, and minimising this pitch with the wire wound, at the same time facilitating proper arrangement of the sequence 12 of reels 2, to form a typical configuration of the stator.

Referring to FIG. 4a, a sequence 12 of coils 5 is shown in the loop closure position, wound on the body 10, the portions 3 being placed between pairs of adjacent coils 5, substantially in contact one with the other. Advantageously, such a high packing coefficient can only be obtained by means of the body 10, which can be extended according to the present invention, the space between coils 5 being practically inaccessible to a mobile head of a winder when the body 10 is in the position of minimum extension.

The opposite reels 1a, 1b of the sequence 12 comprise hooking means which allow a necklace closure of the stator body 10, to form the typical closed loop configuration of a stator. The sequence 12 of coils 5 can also be arranged in another way, for example as an open loop, via a containment structure for collecting the coils 5 or by appropriate attachment means, for example by means of a rigid semicircle closure tie which joins the ends 1a and 1b.

The connection portions 3 can also be made in a rigid and breakable material and connected to the base of the reels 2 so as to allow loop closure of the body 10, nevertheless maintaining the maximum distance between the reels 2 also in the loop closure position.

Figure 8A:
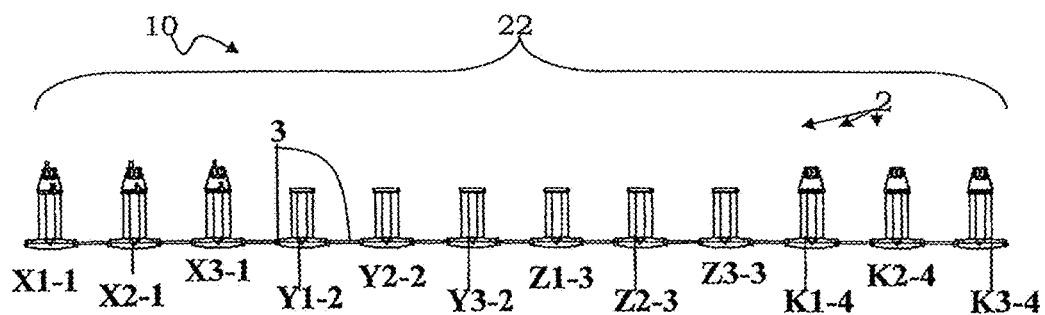
FIGS. 8a-8c show the body of FIG. 2a in the phases of operation for the formation of a different electrical winding.
Figure 8B:
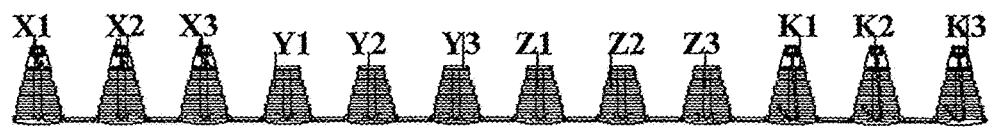
Figure 8C:
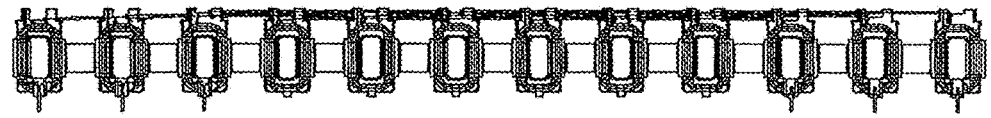

FIGS. 8a-8c show the body 10 comprising rigid connection portions 3, in an initial linear position, while FIG. 12 shows the body 10 closed in a loop for its assembly at the motor.

More particularly FIG. 12 shows that the distance between the reels 2 is still high since the connection portions 3 are not made up of links or extensible material but instead a rigid and breakable material.

For the assembly at the motor, the body 10, already configured in a loop closure position, is positioned inside a circular crown 26 and the connection portions 3 are cut, possibly removed, allowing a very high packing coefficient since the centre distance between adjacent reels is substantially zero, as denoted by z in FIG. 12b.

The circular crown 26 has the function of maintaining the single reels 2 in the circular position during cutting of the joining portions 3 and assembly at the electric motor.

According to an embodiment of the present invention the initial arrangement or position of the body 10, corresponding to the maximum distance between reels 2, is not linear but circular. That is to say that the sequence 12 of reels 2 is arranged in a substantially circular manner along the circumference of diameter $c1$, greater compared to the diameter of a circumference $c0$ along which the sequence 12 of reels 2 is arranged in a loop or semicircle closure position.

Advantageously, in the initial circular position, the angular pitch between reels 2 is such as not to form an obstruction to the movement of the mobile head of the winder, avoiding the bulk generated by the conducting wire already wound on adjacent coils 5.

According to this variant, the portions 3 for connection between adjacent pairs of reels 2 are articulated arms or similar means of connection between reels 2 which allow the sequence 12 to be developed from the initial circular position to the loop closure position and vice versa.

In FIG. 4a the body 10 is shown with conducting wire wound in the loop closure position, with the ends 1a and 1b close together and the connection portions 3 in their position $d0$ of minimum extension. More particularly the detail W of FIG. 4a, enlarged in FIG. 4b, shows in greater detail the windings of the electrical wire on the reel 2. The base 2a of the reel 2 comprises a chock 2b, inside which a portion of the electrical wire is blocked; an end portion of the electrical wire extends from the chock 2b to a head of the reel 2 to abut with a connector 2d, for example of the Faston type, included in the head of the reel 2.

The chock 2b is particularly effective for preventing the electrical wire wound on the reel 2 from unrolling, it being more difficult to maintain this electrical wire wound on the coil 5 the higher the packing coefficient thereon.

As schematised in FIG. 4a, not all the reels 2 are provided with a head 2c: as a function of the technical features of the stator which is to be provided, in particular as a function of the phase of this electric motor, a single conducting wire is wound on two or more reels 2. The passage of the conducting wire between two or more reels is facilitated by one or more guides 2e at the base of the reel, as schematically illustrated in FIGS. 4a, 4b and in FIG. 5. Only the reels 2 whereon the conducting wire has to abut are provided with a head 2c, while the guides 2e are present on the bases 2a of the reels belonging to a single electrical phase.

Figure 5:
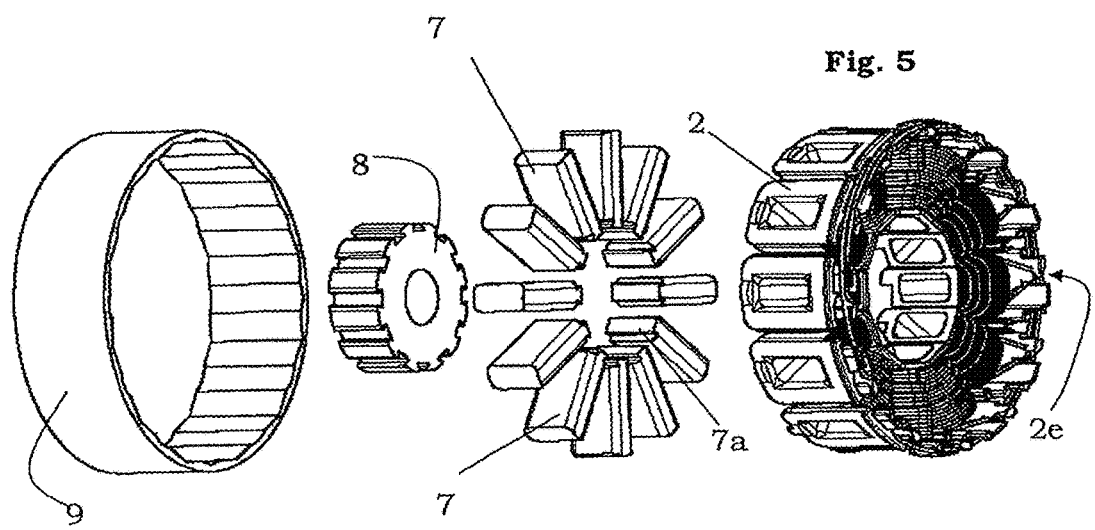
FIG. 5 shows a stator with detached parts, incorporating the body, according to the present invention.

FIG. 5 shows a body 10 with wire wound in loop closure position and ready for assembly with other components 7, 8, 9 of the stator and of the motor 1. More particularly the reels 2 are internally hollow and suitable for holding respective packs 7 of laminations 7 having an end with a dovetail shape for fast coupling in a respective and joined seat 7a of the core 8.

The laminations 7 can also be restrained to the core 8 before being held in the cavity of the respective reels 2: in this case the core 8 and the laminations 7, already inserted, constitute a body with arms extending radially whereon the body 10, with the wire already wound on the reels 2, is inserted, thanks to the possibility of reciprocally moving the coils 5 and of identifying the position of engaging of each cavity on the respective lamination 7.

Figure 10:
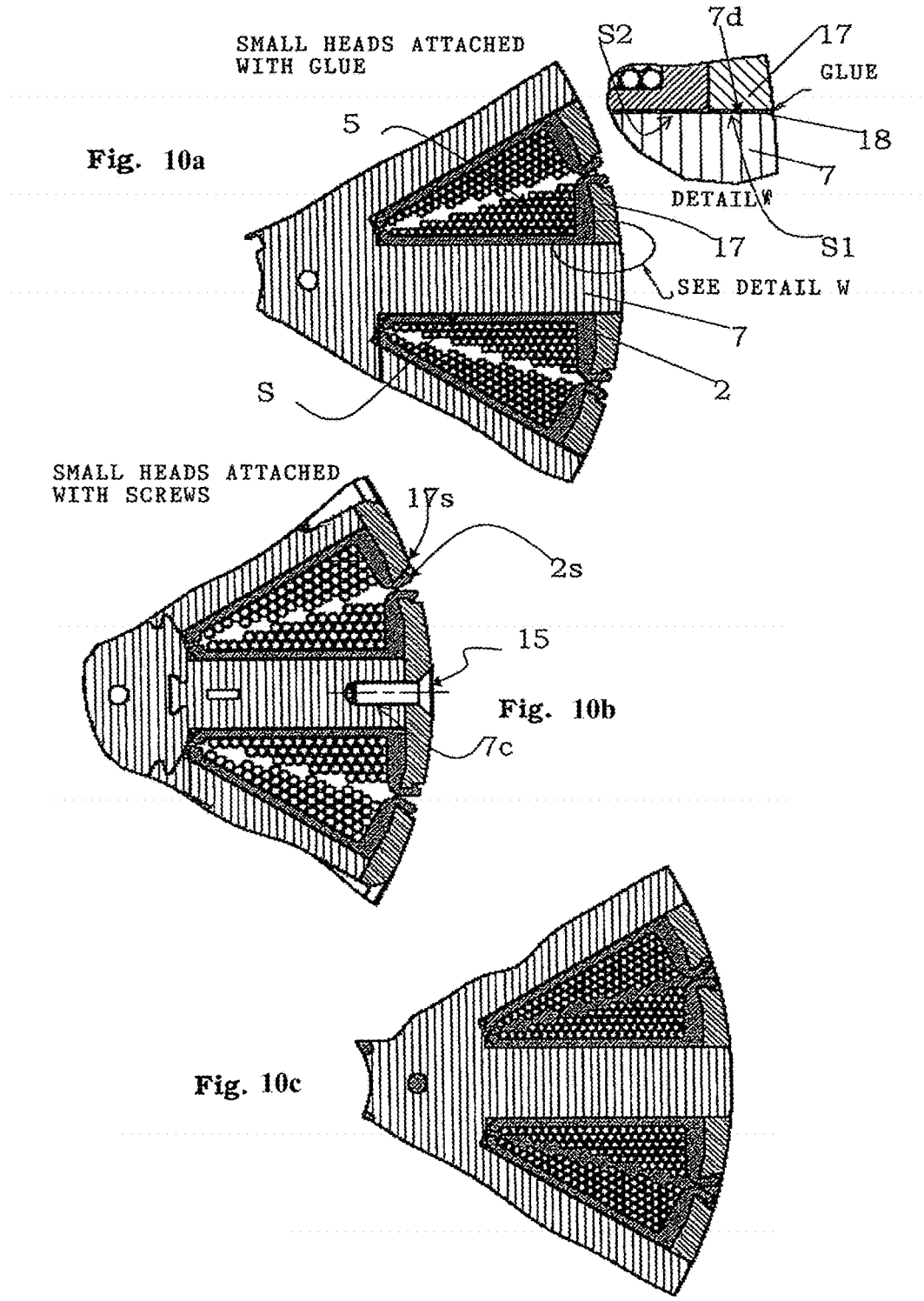
FIGS. 10a-10c show a part of the stator according to the present invention, incorporating the body according to the present invention, with parts assembled in three different variants of assembly.

The description given above with reference to FIG. 5 is not limiting with respect to the configuration of the components 7, 8 and 9 whereat the body 10 is assembled. For example, referring to FIG. 10, the laminations 7 and the central body 8 constitute a single rigid dial body 16 whereon the body 10, with the wire wound, is inserted, reciprocally moving the coils 5 to identify the position of engaging of each cavity on the respective lamination 7.

More particularly, the reels 2 are attached to the corresponding laminations 7 by means of a plurality of small heads 17, for example by means of over-moulding, gluing or mechanical attachment of the small heads to the laminations. The small heads 17 constitute the pole expansion of the stator and therefore complete the magnetic stator circuit of the motor.

FIG. 10a shows schematically the gluing of a small head 17 to a lamination 7; at least one part S1 of the surface S of the lamination 7 is spread with a layer of bonding material 18 so that the small head 17, after having been fitted on an end portion 7d of the lamination 7, is made integral therewith, fixing definitively the reel 2 and the respective coil 5 to the rigid dial body 16. A layer of bonding material 18 can also be provided on a surface S2 of the lamination 7 in contact with the reel 2, to glue also the reel 2 to the lamination 7.

FIG. 10b, wherein the parts substantially identical to FIG. 10a are not numbered, shows schematically the mechanical attachment of a reel 2 to the lamination 7. In this case the lamination 7 and the small head 17 comprise a hole 7c for the tightening of a screw 15 for attachment of the small head 17 to the lamination 7. Advantageously, a portion 17s of the small head 17 and a portion 2s of the reel 2 are shaped to be hooked by slotting. Slotting is facilitated by tightening of the screw 15.

FIG. 10c shows schematically a small head attached with co-moulding to the laminations. The co-moulding is performed with parts inserted, i.e. when the reels 2 are already fitted on the respective laminations 7 and the small heads 17 are placed as coverage of the reels 2, on the end portion 7d of the laminations, possibly hooked undercut to the portion 2s of the reels 2.

Figure 6:
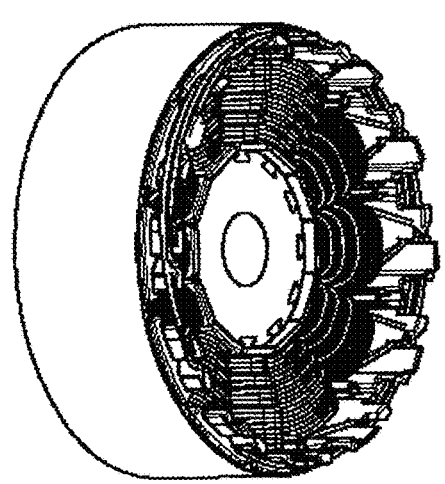
FIG. 6 shows a perspective view of the stator of FIG. 5 with parts assembled.

FIG. 6 shows the components of the stator of FIG. 5 with parts inserted.

Advantageously, assembly of the body to the electric motor, according to the present invention, is performed with the conducting wire already wound around the reels 2 and already set up, for example by means of Fastons, for connection to the power supply. In other words the body 10 allows mechanised winding of the conducting wire on the reels 2 and the attachment of its end points to appropriate connectors, completing the formation of the windings of the stator externally to one of its housing seats in the electric motor. In particular the solution 11c forms a mobile stator structure able to compensate the radial thermal expansion towards the periphery of the stator of the windings, actuating a relative displacement able to reduce the thrust on the small heads which, since they are preferably made in SMC material, are not able to withstand the mechanical stresses induced in this way. Moreover the radial displacement due to the thermal expansion controlled at the design stage allows a further reduction in the relative rotor/stator gap and a recovery of the performances of the motor, above all in terms of maximum torque, which are affected by the inevitable heating of the electrical components of the motors, particularly in the case of applications with the so-called concentrated windings.

As mentioned previously, on the electronic board 45 contact terminals and conductive tracks are provided which allow connection of the ends of the windings of the stator according to needs.

More particularly, FIG. 12 illustrates schematically the configuration of the stator windings to provide a ten-pole motor appropriately using the connections on the electronic board.

FIG. 12A shows the star connection diagram made possible by connecting in the manner indicated the terminals A, B, C, D, E and F of the stator windings of FIG. 12.

Similarly FIG. 12B illustrates an alternative triangle connection which provides different connections between the terminals of the stator windings.

These examples clearly show the polyhedral nature of the solution of the present invention which, starting from a same sequence 22 of reels 2, allows a stator to be formed having different connections of the coils, simply by modifying the connections of the same on the electronic board associated with the same stator, irrespective of the paths of the wire on the periphery of the body of FIG. 6.

FIG. 13 shows an alternative method of connection of the stator windings.

In this further embodiment the stator poles are preferably eight and are organised in such a way as to have all the terminals of the stator windings in a same semicircle of the stator.

FIGS. 13A and 13B show the respective possibilities of star or triangle electrical connection for the terminals A, B, C, D, E and F of the stator windings.

Advantageously, according to the method of the invention, at the end of the winding phase the terminals of the conducting wires abut on the electronic board 45.

Figure 7A:
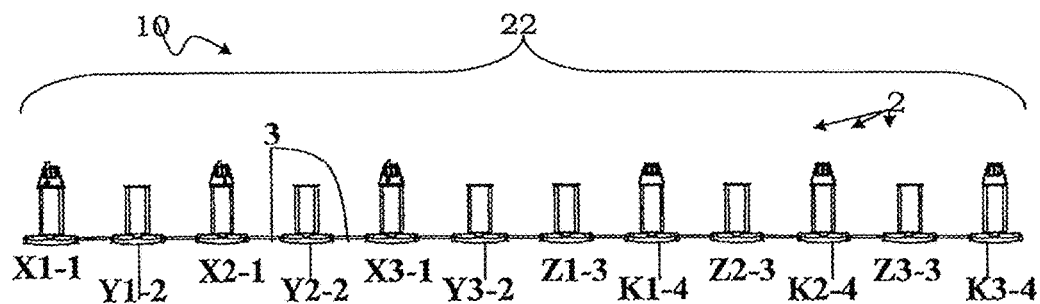
FIGS. 7a-7c show the body of FIG. 2a in the phases of operation for the formation of an electrical winding for the formation of a part of the stator.
Figure 7B:
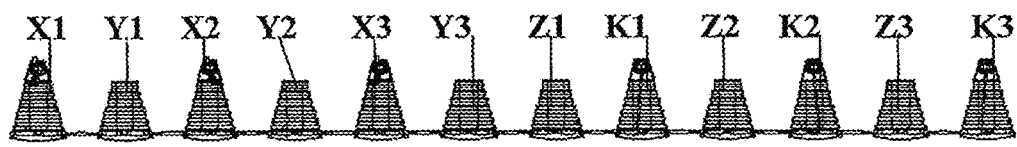
Figure 7C:
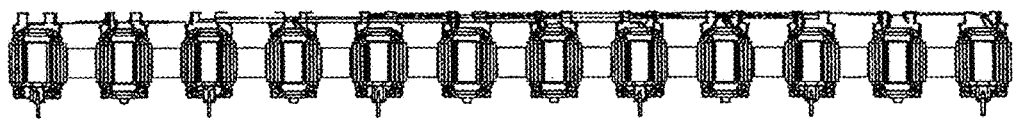

FIGS. 7a-7c illustrate, purely by way of an example, a mode of setting up the stator windings on the plurality of reels 2 connected in the sequence 22.

The alphanumeric references X1, Y1, Z1, K1, X2, Y2, Z2, K2, X3, Y3, Z3, K3 denote a plurality of windings on respective reels formed, for example sequentially, during the phase of winding for a three-phase electric motor. More particularly the first winding X1 performs a winding of a first electrical wire around a first reel X1-1 of the sequence of reels 22. At the end of the first winding the phase of winding performs a second winding X2 of the first conducting wire on a second reel X2-1.

More particularly the second reel X2-1 is not adjacent to the first reel X1-1 in the sequence of reels 22. The phase of winding continues using the same first conducting wire and performing a third winding X3 on a respective reel X3-1 not adjacent to the reels already wound X1-1 and X2-1.

The phase of winding continues using a second electrical wire to perform windings Y1, Y2, Y3. More particularly a winding Y1 is performed on a reel Y1-2 adjacent to the first reel X1-1, already wound in X1, and continuing with the windings Y2, Y3 on respective reels Y2-2, Y3-2 not adjacent to each other.

The phase of winding continues using a third electrical wire for performing windings Z1, Z2, Z3. More particularly a winding Z1 is performed on a reel Z1-3 adjacent to the first reel Y3-2, already wound in Y3, and continuing with the windings Z2, Z3 on respective reels Z2-3, Z3-2 not adjacent to each other.

Finally a fourth wire is used to perform the windings K1, K2, K3 starting from the winding K1 on the reel K1-4 and with the same methods described above for forming the windings K2 and K3 on the reels K2-4 and K3-4.

An alternative embodiment of the method according to the present invention provides for the separation of some adjacent reels, for example reels X1-1 and Y1-1 are separated by means of cutting of the portions for connection 3 one to the other. Advantageously the phase of separation allows obtaining of a high coefficient of packing on each winding and at the same time reduction to a minimum of the space between adjacent reels.

Figure 9:
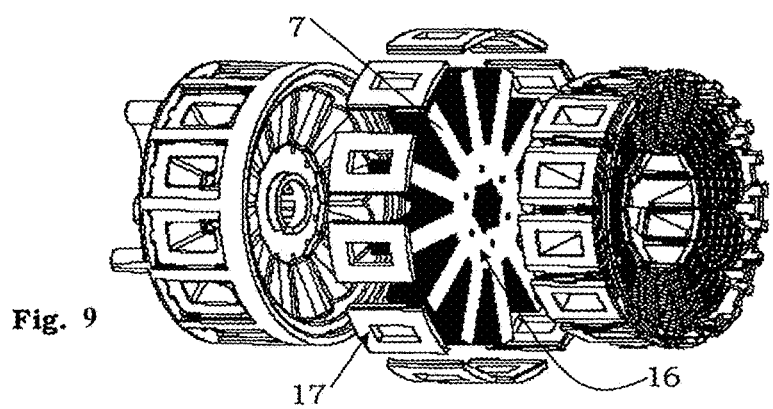
FIG. 9 shows schematically another stator with detached parts, incorporating the body, according to the present invention.

In this embodiment it is preferable for the connection portions 3 not to be extensible or bendable but instead rigid joining portions 3, such as to maintain the reels 2 distanced by said predefined pitch when the body 10 is in a linear position, as shown in FIGS. 9a-9c, and maintain the reels 2 distanced by a predefined angular pitch when the body 10 e is closed as a loop, in a substantially circular position for assembly at the motor, as shown in FIG. 12. More particularly the rigid joining portions 3 are preferable for the phase of separation since their cutting is simpler compared to the cutting of connection portions 3 with points of weakening 4 or flexible links 3a, 3b.

More particularly FIG. 12a shows a detail of a rigid portion of joining 3 between two adjacent reels 2 in a phase of assembly of the body 10.

The phase of separation of the reels 2 according to this embodiment provides for inserting the body 10, already configured in a substantially circular position, inside a circular crown 26 which has the function of maintaining the single reels 2 in said circular position during cutting of the joining portions 3 and assembly at the electric motor.

Assembly of the reels 2 at the electric motor, in particular their insertion in a stator pack, is performed during the phase of separation so that the reels 2 are concentrically moved from the substantially circular position, wherein they are distanced by a predefined angular pitch, to a final circular position, wherein they are substantially compacted to the maximum packing coefficient possible. The joining portions 3 and the circular crown 26 are removed during the phase of separation so that, in the final circular position, the distance between the reels 2 is the minimum distance which can be obtained.

By way of an example, referring to FIGS. 9a-9c, a description is now given of the phases for formation of a different type of winding according to the assembly method of the present invention. In this case too an initial positioning phase of the assembly method provides for positioning of the body 10 in an initial arrangement, suitable for receiving a conducting wire by winding on the reels 2 and performing a phase of winding of the electrical wire on the reels 2, repetitively on the sequence 12 as described herein below.

The alphanumeric references X1, X3, X3, Y1, Y2, Y3, Z1, Z2, Z3, K1, K2, K3 denote a plurality of windings on respective reels performed, for example sequentially, during the phase of winding for a three-phase electric motor. More particularly the first winding X1 performs a winding of a first electrical wire around a first reel X1-1 of the sequence of reels 12; at the end of the first winding the phase of winding performs a second winding X2 of the first conducting wire on a second reel X2-1.

In this case the second reel X2-1 is adjacent to the first reel X1-1 in the sequence of reels 12. The winding phase continues using the same first conducting wire and performing a third winding X3 on a respective reel X3-1, adjacent to the reel already wound X2-1.

The winding phase continues using a second electrical wire to perform windings Y1, Y2, Y3. More particularly a winding Y1 is performed on a reel Y1-2 adjacent to the reel X3-1, already wound in X3, and continuing with the windings Y2, Y3 on respective reels Y2-2, Y3-2 adjacent to each other.

The winding phase continues using a third electrical wire to perform windings Z1, Z2, Z3. More particularly a winding Z1 is performed on a reel Z1-3 adjacent to the reel Y3-2, already wound in Y3, and continuing with the windings Z2, Z3 on respective reels Z2-3, Z3-2 adjacent to each other.

Finally a fourth wire is used to perform the windings K1, K2, K3 starting from the winding K1 on the reel K1-4 and with the same ways described above for forming the windings K2 and K3 on the reels K2-4 and K3-4.

At the end of the winding phase a phase of positioning, substantially similar to the one described for FIGS. 8a-8c provides for positioning the body 10 in a substantially circular arrangement for assembly at the electric motor.

From the previous description it is clear that the motor according to the invention allows containing of the overall bulk to the minimum, optimising at the same time the cost of the material, for example by enabling the use of a conducting wire in aluminium with cost lower than copper wire.

The present invention likewise refers to a method of winding of conducting wires on a body 10 comprising a plurality of reels 2 suitable for creating the pole expansions of a stator for an electric motor. The winding of the conducting wire on a reel 2 is obtained mechanically by means of a winding machine, for example of the flyer type, comprising a mobile head designed to take up position in proximity of the reel 2 and to rotate around it for the winding of the conducting wire.

As shown schematically in FIG. 1a, the body 10 comprises a sequence 12 of reels 2. Each reel 2 has a base 2a, a head 2c opposite the base 2c and a portion of winding 2g between the base and the head suitable for receiving by winding the conducting wire. The reels 2 are hinged in a sequence 12, at a predefined pitch, for example hinged to the respective bases by means of a connection strap 3 of predefined length.

The body 10 is positioned in the range of action of the mobile head, preferably in an initial linear position suitable for receiving the conducting wire by winding on each reel 2, encouraging easy movement of the mobile head between the same reels 2. The body 10 can be extended in such a way that the distance between two adjacent reels 2 in the sequence 12 is variable from a minimum value d0, wherein these reels 2 are substantially in contact, to a maximum value d1.

According to the method of the present invention, before actuating the winding machine, the body 10 is extended in position of maximum extension, positioning the reels 2 at maximum reciprocal distance d1. The phase of extension of the body 10 provides for example for retraining of the ends 1a and 1b of the body 10 to appropriate levers of an extending instrument and for bringing said ends to achieve the position of maximum extension of the body 10; an extending instrument allows the body 10 to be maintained in the winding position even when the portions 3 for joining adjacent reels 2 are made in an elastic material and tend to return the body 10 naturally into a position of minimum extension.

With the body 10 extended, a phase of winding according to the present invention provides for the mobile head of the winding machine to rotate around a first reel 2, forming a corresponding first coil 5. With the coil 5 formed, the mobile head repositions at a second reel 2 for a further phase of winding, the bulk of the conducting wire of the first coil 5 not constituting an obstruction to the movement of the small head. The winding phase proceeds repetitively until the sequence 12 of coils is formed.

Advantageously, according to the method of the invention, the winding phase provides for more than one mobile head to wind simultaneously more than one reel 2 with respective conducting wires, the distance between these reels 2 being such as to allow the simultaneous movement of said more than one mobile head even when one or more coils are produced.

At the end of the winding phase, end parts of these wires abut one or more connectors on respective one or more reels 2, housing, advantageously, all the ends of the conducting wires externally to a housing seat of the stator.

A phase of housing according to the invention also provides for the body 10 comprising the sequence 12 of coils 5 to be moved from the initial linear position to a position of assembly at other components of the electric motor, for example in a U or closed loop position, as shown in FIG. 4a.

Referring to FIGS. 8a-8c a description is now given in greater detail of the winding of the conducting wire according to the method of assembly of the present invention.

As already mentioned, the body 10 comprises a plurality of reels 2 connected in sequence 12 at a predefined pitch, via connection portions 3. An initial positioning phase of the assembly method provides for positioning of the body 10 in an initial arrangement, suitable for receiving a conducting wire by winding on the reels 2 and performing a phase of winding of the electrical wire on the reels 2, repetitively on the sequence 12 as described herein below.

The alphanumeric references X1, X2, X3, X4, Y1, Y2, Y3, Y4, Z1, Z2, Z3, Z4, in FIG. 8a denote a plurality of reels 2 suitable for receiving by winding conducting wires for the formation of the windings of a three-phase electric motor.

More particularly a first phase of the electric motor is formed by winding, sequentially, a first conducting wire around the reels X1, X2, X3, X4.

This first phase is shown schematically in FIG. 8b, where reference X1-1 denotes the winding of the first conducting wire around the first reel X1, while X2-1, X3-1 and X4-1 denote the winding of the first wire, respectively, around the second reel X2, third reel X3 and fourth reel X4. The windings X1-1, X2-1, X3-1, X4-1 form the first phase of the three-phase electric motor.

The second phase of the electric motor is formed by winding, sequentially, a second conducting wire around the reels Y1, Y2, Y3, Y4.

This second phase is shown schematically in FIG. 8b, where the reference Y1-2 denotes the winding of the second conducting wire around the first reel Y1, while Y2-2, Y3-2 and Y4-2 denote the winding of the second wire, respectively, around the second reel Y2, the third reel Y3 and the fourth reel Y4. The windings Y1-2, Y2-2, Y3-2, Y4-2 form the second phase of the three-phase electric motor.

Similarly the third phase of the electric motor is formed by winding, sequentially, a third conducting wire around the reels Z1, Z2, Z3, Z4 and forming the windings Z1-3, Z2-3, Z3-3, Z4-3.

FIG. 8c shows the body 10 in a view from above, with windings already formed, wherein the passage of the three conducting wires between the guides 2e of the reels 2 can be seen. More particularly, during the winding, the first wire F1 abuts the head of the reel X1, is wound around the reel X1, for example clockwise, is made to pass from the guide 2e of the reel X1 to the guide 2e of the reel X2, and is wound there on the reel X2, for example anticlockwise. The wire F1 is then made to pass via the guides 2e of the reels Y1, Y2, Z1, Z2 as far as the reel X3 where it is wound. Finally it is made to pass from the guide 2e of the reel X3 to the guide 2e of the reel X4, wound there on reel X4 and attached to its head portion.

The second wire F2 abuts the head of the reel Y1, is wound around the reel Y1, for example clockwise, is made to pass from the guide 2e of the reel Y1 to the guide 2e of the reel Y2, and wound there on the reel Y2, for example anticlockwise. The wire F2 is then made to pass via the guides 2e of the reels Z1, Z2, X3, X4 as far as the reel Y3 where it is wound. Finally it is made to pass from the guide 2e of the reel Y3 to the guide 2e of the reel Y4, wound there on the reel Y4 and attached to its head portion.

Similarly winding of the wire F3 is formed starting from the reel Z1.

FIG. 8c shows that between the guides of the reel X1 and of the reel X2, and between the guides of the reel X2 and of the reel Y1 only the wire F1 is passed. Between the guides of the reel Y1 and of the reel Y2, and between the guides of the reel Y2 and of the reel Z1 both the wire F1 and the wire F2 pass. Finally, the wire F1, the wire F2 and the wire F3 are passing between the guides of the reel Z1 and of the reel Z2 as well as between the guides of the reel Z2 and of the reel X3.

The passage of the wires between the guides 2e described above is substantially symmetrical, i.e. starting winding of the wire F3 from the reel Z4 and proceeding from right to left in the body 10 of FIG. 8a.

At the end of the winding phase, a second phase of positioning provides for positioning of the body 10 in a substantially circular arrangement for assembly at the electric motor.

As mentioned the initial positioning phase comprises an extension of the body 10, such as to increase the pitch and facilitate the winding phase while the second positioning phase comprises a decrease in the pitch between the reels 12.

According to an embodiment of the method of the present invention, the positioning phase comprises a phase of separation between adjacent reels, for example between the reels X1 and X2, performed by cutting of the portions 3 for connecting them. Advantageously the phase of separation enables a high packing coefficient to be obtained on each winding and at the same time the space between adjacent reels to be reduced to a minimum.

In this embodiment it is preferable for the connection portions 3 not to be extensible or bendable but instead rigid joining portions 3, such as to maintain the reels 2 distanced by said predefined pitch when the body 10 is in the linear position, as shown in FIGS. 9a-9c, and maintain the reels 2 distanced by a predefined angular pitch when the body 10 is closed in a loop, in a substantially circular position for the assembly at the motor, as shown in FIG. 12. More particularly, the rigid joining portions 3 are preferable for the phase of separation since their cutting is simpler compared to the cutting of connection portions 3 with points of weakening 4 or flexible links 3a, 3b.

FIG. 12a shows a detail of a rigid joining portion 3 between two adjacent reels 2 in a phase of the assembly of the body 10.

The phase of separation of the reels 2 according to this embodiment provides for inserting the body 10, already configured in a substantially circular position, inside a circular crown 26 which has the function of maintaining the individual reels 2 in said circular position during the cutting of the joining portions 3 and assembly at the electric motor.

Assembly of the reels 2 on the electric motor, more particularly their insertion in a stator pack, is performed in the phase of separation so that the reels 2 are concentrically moved from the substantially circular position, wherein they are distanced by a predefined angular pitch, to a final circular position, wherein they are substantially compacted to the maximum possible packing coefficient. The joining portions 3 and the circular crown 26 are removed during the phase of separation so that, in the final circular position, the distance between the reels 2 is the minimum distance which can be obtained.

By way of an example, referring to FIGS. 9a-9c, a description is now given of the phases for the formation of a different type of winding according to the method of assembly of the present invention, again by way of an example with reference to the formation of a winding for a three-phase twelve-pole electric motor.

In this case too an initial positioning phase of the method of assembly provides for positioning the body 10 in an initial arrangement, suitable for receiving a conducting wire by winding on the reels 2 and for performing a winding phase of the electrical wire on the reels 2, repetitively on the sequence 12 as described herein below.

The alphanumeric references X1, X2, X3, X4, Y1, Y2, Y3, Y4, Z1, Z2, Z3, Z4, in FIG. 9a denote a plurality of reels 2 suitable for receiving by winding conducting wires for the formation of the electrical windings of a three-phase electric motor. More particularly, a first phase of the electric motor is achieved by winding, sequentially, a first conducting wire around the reels X1, X2, X3, X4.

This first phase is shown schematically in FIG. 9b, where reference X1-1 denotes the winding of the first conducting wire around the first reel X1, while X2-1, X3-1 and X4-1 denote the winding of the first wire, respectively, around the second reel X2, the third reel X3 and the fourth reel X4. The windings X1-1, X2-1, X3-1, X4-1 form the first phase of the three-phase electric motor.

The second phase of the electric motor is formed by winding, sequentially, a second conducting wire around the reels Y1, Y2, Y3, Y4.

This second phase is shown schematically in FIG. 9b, where reference Y1-2 denotes the winding of the second conducting wire around the first reel Y1, while Y2-2, Y3-2 and Y4-2 denote the winding of the second wire, respectively, around the second reel Y2, the third reel Y3 and the fourth reel Y4. The windings Y1-2, Y2-2, Y3-2, Y4-2 form the second phase of the three-phase electric motor.

Similarly the third phase of the electric motor is formed by winding, sequentially, a third conducting wire around the reels Z1, Z2, Z3, Z4 and forming the windings Z1-3, Z2-3, Z3-3, Z4-3.

FIG. 9c shows the body 10 in a view from above, with the windings already formed, wherein the passage of the three conducting wires between the guides 2e of the reels 2 can be seen. More particularly the first wire F1, abutting the head of the reel X1, is wound around the reel X1, for example clockwise, is made to pass from the guides 2e of the reels X1, Y1, Z1 up to the reel X2 and wound there, for example anticlockwise. The wire F1 is then made to pass via the guides 2e of the reels X2, Y2, Z2 up to the reel X3 where it is wound. Finally, the wire F is made to pass from the guides 2e of the reel X3, Y3, Z3 up to the reel X4, wound there at the reel X4 and abutting its head portion.

The second wire F2 abuts the head of the reel Y1, is wound around the reel Y1, for example clockwise, is made to pass from the guide 2e of the reel Y1 to the guide 2e of the reel Z1, X2, Y2 and wound there at the reel Y2, for example anticlockwise. The wire F2 is then made to pass via the guides 2e of the reels Z2, X3, Y3 and wound at the reel Y3. Finally, it is made to pass from the guides 2e of the reel Z3, X4, Y4, wound at the reel Y4 and attached to its head portion.

Similarly the winding of the wire F3 from the reel Z1 is performed.

In FIG. 9c it can be seen that between the guides of the reel X1 and of the reel Y1, and between the guides of the reel Y1 and of the reel Z1, only the wire F1 is passed. Between the guides of the reel Z1 and of the reel X2 both the wire F1 and the wire F2 pass. Finally, all the wires pass between the guides of the reel X2 and of the reel Y2, and between the guides of the reel Y2 and of the reel Z2.

The passage of the wires between the guides 2e described above is substantially symmetrical, i.e. starting to wind the wire F3 from the reel Z4 and proceeding from right to left in the body 10 of FIG. 9a.

At the end of the winding phase, a positioning phase, substantially similar to that described for FIGS. 8a-8c provides for positioning of the body 10 in a substantially circular arrangement for assembly at the electric motor.

The invention claimed is:

1. A synchronous electric motor comprising:
   a central stator;
   an external rotor; and
   a plurality of reels for the stator windings arranged according to a predefined pitch and intended to receive respective windings of a conducting wire, each reel comprising a base portion and a winding portion,
   wherein said stator comprises a mobile body which can be articulated from an initial arrangement, suitable for receiving the conducting wire by winding on said reels, to a final arrangement of substantially annular configuration in which the wire wound on the reels has ends electrically connected to corresponding terminals of an electronic printed circuit board associated with the stator of the motor,
   wherein said mobile body comprises said reels and connection portions between the base portions of adjacent reels,
   each connection portion having a first link, hingedly attached at the base portion of a reel, and a second link hingedly attached at the base portion of the adjacent reel, said first and second links being connected together at a bending point, a line of weakening being provided that allows bending of said connection portion at said bending point,
   wherein, in the initial arrangement, each connection portion is set in a first configuration, in which said first and second links are substantially linearly aligned and define a first pitch between the base portions of adjacent reels;
   wherein, in the final arrangement, each connection portion is set in a second configuration, in which said first and second links form an acute angle, the connecting portion being folded about the bending point, with the bending point toward, the centre of the substantially annular configuration and ends of the links attached to the reels pointing away from the centre of the substantially annular configuration, defining a second pitch between the base portions of adjacent reels;
   wherein said first pitch is longer than said second pitch thus reducing a spacing between the base portions in the final arrangement.

2. The synchronous electric motor according to claim 1, wherein conductive tracks and terminals of said electronic printed circuit board allow adoption for the stator windings a triangle or star electrical connection alternatively and according to needs.

3. The synchronous electric motor according to claim 1, wherein a magnetic sensor of position of the rotor is peripherally mounted on said electronic printed circuit board.

4. The synchronous electric motor according to claim 3, wherein said sensor is a Hall sensor.

5. The synchronous electric motor according to claim 1, wherein said electronic printed circuit board is restrained to the stator by fixing of a dissipator member connected to one end of the stator.

6. The synchronous electric motor according to claim 1, wherein the reels are mounted on respective corresponding packs of laminations by a plurality of small heads each of which forms the pole expansion of the stator and completes the magnetic stator circuit of the motor.

7. The synchronous electric motor according to claim 1, wherein each reel is restrained to a corresponding small head by means of over-moulding, gluing or mechanical attachment of the small heads to the pack of laminations.

8. A substantially rectilinear body for an electric motor of the type comprising a plurality of reels, each reel comprising a base portion and a winding portion, arranged according to a predefined pitch and intended to receive by winding at least one conducting wire, said body comprising connection portions between the base portions of adjacent reels which can be configured either in a first configuration, adapted for the winding of the wire around the reels, or in a second configuration, adapted for the assembly of the body in the motor, wherein:
   said predefined pitch is a high pitch in the first configuration and a small pitch in the second configuration, the high pitch being longer than the small pitch;

said reels are arranged according to a linear pitch in the first configuration and curved in an annular shape in the second configuration;

each connection portion having a first link, hingedly attached at the base portion of a reel, and a second link hingedly attached at the base portion of the adjacent reel, said first and second links being connected together at a bending point, a line of weakening being provided that allows bending of said connection portion at said bending point;

wherein in the first configuration, said first and second links are substantially linearly aligned, so that the distance between the base portions of adjacent reels has a maximum extension, corresponding to said high pitch; wherein in the second configuration, said first and second links form an acute angle, the connecting portion being folded about the bending point toward the centre of the annular shape and ends of the links attached to the reels pointing away from the centre of the annular shape, so that the distance between the base portions of adjacent reels has a minimum extension, corresponding to said small predefined pitch.

9. The body according to claim 8, wherein said portions are elastic.

10. The body according to claim 8, wherein said extended predefined pitch is circular, said body being substantially arranged along a circumference of diameter c1 greater than a diameter c0 of a circumference along which said body is substantially arranged at said small angular pitch.

11. The body according to claim 8, wherein said reel comprises a chock, for the orientation of an end portion of said electrical wire from a base of said reel to one of its heads.

12. The body according to claim 11, wherein said head comprises a connector for the attachment of an end of said end portion.

13. The body according to claim 8, wherein said reels comprise respective guides for passage of the conducting wire intended to achieve a predetermined electrical phase between said reels.

14. The body according to claim 8, wherein said reel is internally hollow.

15. A method of assembly of a body according to claim 8, said method comprising:

a positioning phase of said body in an initial arrangement, suitable for receiving said conducting wire by winding on said reels;

a winding phase of said electrical wire on said reels, recurring repetitively on said sequence; and a positioning phase of said body in a substantially circular arrangement for the assembly of said body on said electric motor, wherein said initial positioning phase provides for maintaining said reels connected at a high pitch; and wherein said circular positioning phase provides for configuring said connection portions for moving said reels together at a small pitch.

16. The assembly method according to claim 15, wherein said circular positioning phase provides for shortening said connection portions from a maximum extension, corresponding to said high pitch, to a minimum extension, corresponding to said small predefined pitch.

17. The assembly method according to claim 15, wherein said circular positioning phase provides for the cutting and/or removing of said connection portion to move together said reels at said small pitch, substantially placing in contact reels adjacent one to the other.

* * * * *